United States Patent [19]

Anschutz et al.

[11] 3,871,092

[45] Mar. 18, 1975

[54] CUTTING TOOL

[75] Inventors: Erhard Anschutz, Plochingen; Walter Gotz, Wernau, both of Germany

[73] Assignee: Feldmuhle Anlagen- und Produktionsgesellschaft mit beschrankter Haftung, Dusseldorf-Oberkassel, Germany

[22] Filed: Nov. 27, 1973

[21] Appl. No.: 419,404

[30] Foreign Application Priority Data
Dec. 8, 1972 Germany.............................. 2260097

[52] U.S. Cl...................... 29/95 R, 29/95 C, 29/96
[51] Int. Cl.............................................. B26d 1/00
[58] Field of Search............ 29/96, 95 R, 95 C, 102, 29/105 R

[56] References Cited
UNITED STATES PATENTS

| 104,055 | 6/1870 | Munro et al. ........................ 29/95 R |
| 2,877,535 | 3/1959 | Williams ................................ 29/96 |
| 2,897,580 | 8/1959 | Huber.................................... 29/96 |
| 3,152,385 | 10/1964 | Wheildon et al.................... 29/95 R |
| 3,557,417 | 1/1971 | Kollar.................................... 29/96 |

*Primary Examiner*—Leonidas Vlachos
*Attorney, Agent, or Firm*—Hans Berman; Kurt Kelman

[57] ABSTRACT

A tool bit, which is a unitary, imperforate body of sintered aluminum oxide, has a flat, circular top face and a conical face about an axis perpendicular to the top face so that the top face and the conical face define a circular cutting edge. The conical face tapers from the top edge at an apex angle of 6° to 20° providing an end clearance of 3° to 10°. Two flat seating surfaces symmetrical relative to a plane through the axis intersect the conical surface and converge in a seating edge parallel to the top face through the axis. The seating faces conformingly engage a receptacle member fixedly, but releasably mounted on a shank, and the conical face is backed by a conforming concave face of the shank over an arc of about 90°, leaving the cutting edge exposed in an arc of about 270° and projecting beyond the shank.

6 Claims, 5 Drawing Figures

CUTTING TOOL

This invention relates to cutting tools, and particularly to a tool in which a tool bit is secured in a receptacle on a shank by a clamping device.

Tools of the type described permit the use of replaceable tool bits made of materials not suitable for constituting the entire tool, such as carbide and oxide bits. Ceramic oxide bits, or bits containing more than 50% refractory oxides of adequate hardness are superior to carbide bits in their useful life at the elevated temperatures generated at high cutting speeds. Bits predominantly consisting of aluminum oxide and/or zirconium oxide are commonly employed and may contain metal carbides, particularly titanium carbides and other minor constituents.

Clamping the relatively brittle oxide bits to a shank or tool holder is difficult. Whereas a carbide bit may be fastened in a precisely defined position on a shank by means of a pin entering a bore in the bit, an oxide bit must not be weakened by a bore, and oxide bits were excluded heretofore from many applications which require the bit to be fastened on a shank in a precisely defined position maintained under cutting stress even when the stress is applied transversely to the direction of elongation of the shank as in the cutting of grooves or in the simultaneous cutting of two closely spaced surfaces of a work piece.

An important object of this invention is the provision of a cutting tool in which the relative position of a tool bit and of a shank is firmly fixed by clamping during use of the tool without relying on a bore in the tool bit.

Another object is the provision of a tool bit suitable for use in the afore-described tool.

With these and other objects in view, the invention provides a tool bit having a flat top face of convexly arcuate circumference about an axis transverse to the face, and an axial face tapering in a direction away from the top face, the circumference of the top face and the axial face jointly defining an annular cutting edge. The tool bit further has two seating faces extending from the axial face in a direction away from the cutting edge toward a line of intersection transverse to the axis of the top face.

Preferably, the top face of the tool bit is circular, and the axis is perpendicular to the top face in the center thereof so that the cutting edge is circular. The elongated shaft associated with the bit in the cutting tool of the invention provides a receptacle which conformingly engages the seating faces, and a clamping mechanism on the shaft engages the top face of the bit and urges the seating faces into engagement with the receptacle.

Other features, additional objects, and many of the attendant advantages of this invention will readily be appreciated as the same becomes better understood by reference to the following detailed description of a preferred embodiment when considered in connection with the appended drawing in which.

Figure 1:
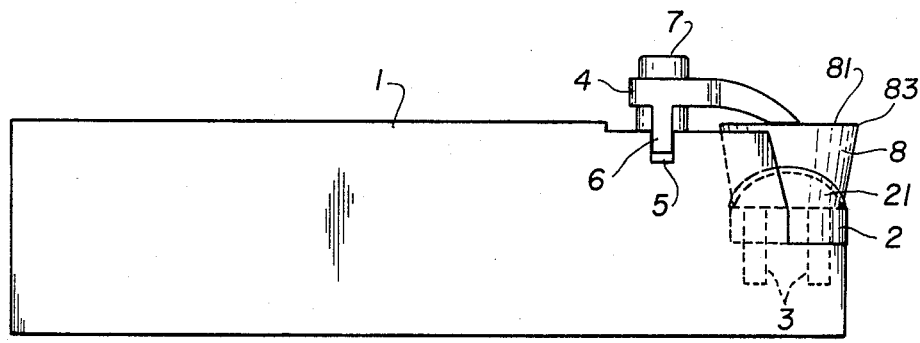
FIG. 1 shows a cutting tool of the invention in side elevation.
Figure 2:
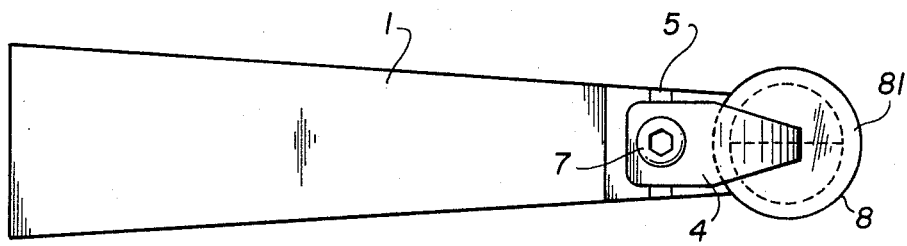
FIG. 2 illustrates the tool of FIG. 1 in top plan view.

Referring now to the drawing in detail, and initially to FIGS. 1 and 2, there is seen an elongated steel shank 1 tapering slightly toward its front end. The front top corner of the shank 1 has a recess bounded by a frustoconically curved, concave side wall about an axis which is upright in the illustrated position of the shank and equidistant from the bottom of the side wall and the flat front face of the shank. The bottom portion of the recess has a cylindrically arcuate side wall about the same axis, and the bottom face of the recess is flat and perpendicular to the axis.

Figure 5:
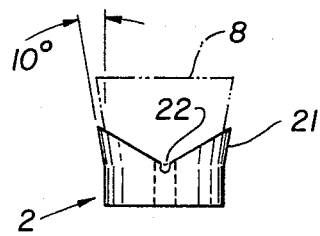
FIG. 5 shows a tool bit receptacle of the apparatus of FIG. 1 in front elevation.

A receptacle 2 is received in the recess of the shank 1. Its bottom portion is conformingly received in the cylindrical part of the recess, and its top portion has two ridges 21 contoured to fit into the frustoconical recess portion and bounding therebetween a groove 22, as is best seen in FIG. 5. The receptacle 2 is fixedly, but releasably fastened to the shank 1 by two screws 3.

A clamping jaw 4 engages a transverse groove 5 in the top face of the shank 1 by means of two integral depending plate or rib portions 6, as described in more detail in U.S. Pat. No. 3,331,116. A clamping screw 7 extends from the top face of the jaw 4 through the groove 5 into the body of the shhank 1. The flange portions 6 secure the angular position of the jaw 4 on the screw 7. The free end of the jaw 4 engages the flat, circular top face 81 of a tool bit 8 which is a unitary, imperforate body essentially consisting of sintered aluminum oxide (95% or more $Al_2O_3$) and having a hardness better than 8 on the Mohs scale.

Figure 3:
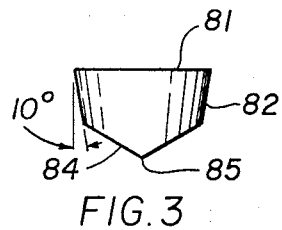
FIG. 3 is a front elevational view of the tool bit in the tool of FIG. 1
Figure 4:
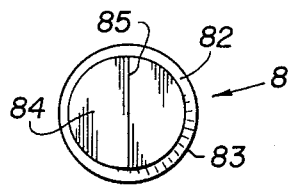
FIG. 4 is a bottom plan view of the bit of FIG. 3.

As is best seen in FIGS. 3 and 4, a top face 81 and a conically convex face 82 of the bit 8 about a non-illustrated axis perpendicular to the center of the top face 81 form the circular cutting edge 83 of the bit 8. The apex angle of the face 82 is chosen between 6° and 20°, and is approximately 20° in the illustrated embodiment. The apex portion of the cone defined by the face 82 is cut off by two flat, identical seating faces 84 of the bit 8. The seating faces 84 are symmetrical relative to a plane through the bit axis and meet in a seating edge 85 located in the plane of symmetry. The seating faces 84 define respective planes which intersect each other in the illustrated edge 85 toward which they converge in a direction away from the cutting edge 83. The seating edge 85 thus is parallel to the top face 81 and perpendicular to the bit axis. The faces 81, 82, 84 jointly constitute the entire surface of the tool bit.

The groove 22 is shaped and positioned to conform to the seating faces 84 when the bit 8 is inserted in the receptacle 2 in a position in which the line of intersection of the planar faces 84 or their seating edge 85 extends in the direction of elongation of the shank 1.

In the operative, inserted position of the bit 8, the cutting edge 83 projects beyond the shank 1 and associated elements radially relative to the bit axis over an arc of approximately 270°, and the shank 1 backs the bit 8 by engagement with the axial, conical face 82 of the bit over an arc of approximately 90°. Displacement of the bit relative to the shank 1 transversely to the shank 1 in a horizontal direction, as viewed in FIGS. 1 and 2, is prevented by engagement of the seating faces 84 with the walls of the groove 22 in the receptacle 2 under the urging of the clamping jaw 4.

In assembling the cutting tool shown in FIGS. 1 and 2, the receptacle 2 is installed by means of the screws 3 so that the groove 22 is longitudinal relative to the shank 1. When the bit 8 is inserted in the receptacle 2, its axial face 82 is guided by the cooperating face of the shank 1 into a precisely centered position without requiring particular care or skill on the part of the tool operator. The clamping jaw 4, when thereafter applied and tightened by means of the screw 7, maintains the desired position of the bit 8 during subsequent cutting operations regardless of the direction of the stresses applied to the cutting edge 83.

Because of the afore-described cooperation of the faces of the bit 8 with faces of the shank 1, the receptacle 2, and the jaw 4, the shank 1 can be made narrower than the diameter of the circular cutting edge 83 so that the latter is exposed for cutting action about an angle much greater than 180°, and approximately 270° in the illustrated embodiment. The advantages are obvious. The bit 8 may be reversed in the receptacle 2 to expose that portion of the edge 83 which is initially directed toward the concave face of the shank 1.

Although tool bits consisting almost entirely of aluminum oxide have relatively low alternating bending strength, they can be used in the illustrated cutting tool without difficulty to provide the advantages of high compressive strength and excellent heat resistance inherent in the oxide material.

Tool bits which differ in details from the features of the illustrated and preferred bit 8 have been used successfully and are superior to known ceramic oxide bits. The top face 81 may be modified to retain a convexly arcuate circumference deviating from the illustrated circular shape. While less versatile, such a bit still provides many of the advantages described above.

Similarly, the top face need not be perpendicular to the axis of the conical face 82 so that the end clearance of the tool varies along the circumference of the top face. This may be a desirable feature in automatic machine tools.

The axial face of the bit may taper away from the cutting edge in a shape which is at least partly pyramidal. Such a bit is more difficult to produce, and the conforming recess of the shank 1 less convenient to shape, but the modified arrangement would still produce the desired result.

More than two seating faces may be provided in an obvious manner, although two seating faces arranged as shown provide best lateral stability to the installed bit and are formed with least expense. The provision of a seating edge at the line of intersection of the planes defined by the seating faces is convenient, but not critical, and seating faces which are not symmetrical relative to a plane defined by the line of intersection and the bit axis may perform their function, although they may make it necessary to reverse the receptacle 2 together with the bit 8 in the manner described above.

A releasably mounted receptacle 2 for the tool bit 8 is preferred because the receptacle is likely to wear out after extended use which does not affect the shank 1. However, the groove 22 may be cut into a suitably modified shank without immediate change in function.

It should be understood, therefore, that the foregoing disclosure relates only to a preferred embodiment of the invention, and that it is intended to cover all changes and modifications of the example of the invention herein chosen for the purpose of the disclosure which do not depart from the spirit and scope of the invention set forth in the appended claims.

We claim:

1. A tool bit having a flat top face of convexly arcuate circumference about an axis transverse to said face, an axial face tapering in a direction away from said top face, said circumference and said axial face jointly defining an annular cutting edge, and two flat seating faces converging from said axial face in a direction away from said cutting edge toward a line of intersection transverse to said axis, said top face, said axial face, and said seating faces jointly constituting the entire surface of said tool bit.

2. A tool bit as set forth in claim 1, wherein said cutting edge is circular and said axial face is conical about said axis.

3. A tool bit as set forth in claim 2, wherein said line of intersection is parallel to said top face, the top face being perpendicular to said axis.

4. A tool bit as set forth in claim 1 which is a unitary, imperforate body of a material having a hardness of more than 8 on the Mohs scale of hardness.

5. A tool bit as set forth in claim 4, wherein said material contains at least 95% $Al_2O_3$.

6. A tool bit as set forth in claim 4, wherein said axis is perpendicular to said top face, said cutting edge being cicrcular about said axis, said axial face being conical about said axis at an apex angle of 6° to 20°, said seating faces jointly forming a seating edge along said line of intersection, said seating edge being parallel to said top face, said axis and said seating edge defining a plane of symmetry of said body.

* * * * *